United States Patent
Tabata et al.

(10) Patent No.: US 11,358,418 B2
(45) Date of Patent: Jun. 14, 2022

(54) PNEUMATIC TIRE AND MOLD FOR VULCANIZATION-MOLDING SAME

(71) Applicant: Sumitomo Rubber Industries, Ltd., Kobe (JP)

(72) Inventors: Katsunori Tabata, Kobe (JP); Takuma Watanabe, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 149 days.

(21) Appl. No.: 16/673,659

(22) Filed: Nov. 4, 2019

(65) Prior Publication Data
US 2020/0164698 A1    May 28, 2020

(30) Foreign Application Priority Data

Nov. 26, 2018    (JP) .............................. JP2018-220433

(51) Int. Cl.
*B60C 15/00*    (2006.01)
*B60C 15/024*    (2006.01)
(Continued)

(52) U.S. Cl.
CPC ...... *B60C 15/0628* (2013.01); *B60C 15/0009* (2013.01); *B60C 15/0018* (2013.01);
(Continued)

(58) Field of Classification Search
CPC ........... B60C 2019/008; B60C 15/024; B60C 15/0018; B60C 5/14; B29D 2030/062; B29D 2030/0617
(Continued)

(56) References Cited

U.S. PATENT DOCUMENTS

| 1,462,517 | A | * | 7/1923 | Marquette | .......... B29D 30/0606 |
| | | | | | 152/543 |
| 1,915,963 | A | * | 6/1933 | Wait | ...................... B60C 15/024 |
| | | | | | 156/135 |

(Continued)

FOREIGN PATENT DOCUMENTS

| FR | 2429111 A1 | * | 1/1980 | ........... B60C 15/024 |
| JP | 2001233013 A | * | 8/2001 | |

(Continued)

OTHER PUBLICATIONS

Machine Translation: FR-2429111-A1, Poque Dionysius Josef, (Year: 2021).*

(Continued)

*Primary Examiner* — Kendra Ly
(74) *Attorney, Agent, or Firm* — Birch, Stewart, Kolasch & Birch, LLP

(57) ABSTRACT

A pneumatic tire has a turned-up carcass ply and a non-turnup carcass ply. The turned-up carcass ply is turned up around bead cores in respective bead portions from the inside to outside of the tire so as to form a pair of turned up portions extending radially outwardly on the axially outsides of the respective bead cores, and a main portion extending between the turned up portions. The non-turnup carcass ply extends between the bead portions and terminates to have edges positioned on the axially outsides of the respective turned up portions. The bead portions are each provided on its outer surface with vent lines protruding therefrom and extending continuously in the tire circumferential direction. The vent lines include a radially outer vent line formed radially outside the edges of the non-turnup carcass ply, and a radially inner vent line formed radially inside the edges of the non-turnup carcass ply.

11 Claims, 4 Drawing Sheets

(51) Int. Cl.
*B60C 15/06* (2006.01)
*B60C 19/00* (2006.01)

(52) U.S. Cl.
CPC .... *B60C 15/024* (2013.01); *B60C 2015/0617* (2013.01); *B60C 2019/008* (2013.01)

(58) Field of Classification Search
USPC ........................................................ 152/450
See application file for complete search history.

(56) References Cited

U.S. PATENT DOCUMENTS

| | | | | | |
|---|---|---|---|---|---|
| 2,587,470 | A | * | 2/1952 | Herzegh | B60C 5/16 |
| | | | | | 152/504 |
| 3,203,461 | A | * | 8/1965 | Enabnit | B60C 15/024 |
| | | | | | 152/543 |
| 4,015,652 | A | * | 4/1977 | Harris | B60C 15/024 |
| | | | | | 152/379.3 |
| 4,353,403 | A | * | 10/1982 | Ruip | B60C 5/12 |
| | | | | | 152/523 |
| 5,318,089 | A | * | 6/1994 | Tagashira | B60C 5/16 |
| | | | | | 152/539 |
| 5,460,214 | A | * | 10/1995 | Fujita | B60C 15/024 |
| | | | | | 152/540 |
| 5,769,981 | A | * | 6/1998 | Turley | B60C 15/024 |
| | | | | | 152/544 |
| 2017/0008243 | A1 | * | 1/2017 | Oshima | B29D 30/0606 |
| 2017/0274710 | A1 | * | 9/2017 | Matsumoto | B60C 15/06 |
| 2020/0130424 | A1 | * | 4/2020 | Lee | B60C 15/024 |

FOREIGN PATENT DOCUMENTS

| | | | |
|---|---|---|---|
| JP | 2005-59802 | A | 3/2005 |
| JP | 2005059802 | A * | 3/2005 |
| JP | 2005178333 | A * | 7/2005 |

OTHER PUBLICATIONS

Machine Translation: JP-2005059802-A, Okada, Toshihiro, (Year: 2021).*

Machine Translation: JP-2005178333-A, Tsujimoto, Toji, (Year: 2021).*

Machine Translation: JP-2001233013-A, Miyazaki, Tatsuya, (Year: 2021).*

* cited by examiner

PNEUMATIC TIRE AND MOLD FOR VULCANIZATION-MOLDING SAME

TECHNICAL FIELD

The present invention relates to a pneumatic tire having a carcass and a mold for vulcanization-molding the pneumatic tire.

BACKGROUND ART

Patent Document 1 below discloses a pneumatic tire for a light truck, and the tire is provided with a radial ply carcass composed of a turned-up carcass ply and a non-turnup carcass ply in order to increase the rigidity of the bead portions and improve the durability of the bead portions.
Patent Document 1: Japanese Patent Application Publication No. 2005-059802

SUMMARY OF THE INVENTION

Problems to be Solved by the Invention

In the tire disclosed in Patent Document 1, however, at the position of each of the radially inner edges of the non-turnup carcass ply, a step is formed on the outer surface of the partly-built raw tire, and air is liable to be trapped in this position in the built raw tire, which causes molding defect during vulcanization-molding the tire.

The present invention was made in view of the problem as described above, and a primary objective of the present invention is to provide a pneumatic tire and a mold for vulcanization molding the same in which both prevention of the molding defect and durability of the bead portions can be achieved.

According to one aspect of the present invention, a pneumatic tire comprises:
a tread portion,
a pair of sidewall portions,
a pair of bead portions each with a bead core embedded therein, and
a carcass composed of carcass plies extending between the bead portions through the tread portion and the sidewall portions, wherein
the carcass plies include a turned-up carcass ply and a non-turnup carcass ply,
the turned-up carcass ply extends between the bead portions and is turned up around the bead core in each bead portion from the axially inside to the outside of the tire so as to form a pair of turned up portions extending radially outwardly on the axially outsides of the respective bead cores, and a main portion extending between the turned up portions, and
the non-turnup carcass ply extends between the bead portions and terminates so that edges thereof are positioned on the axially outsides of the respective turned up portions, wherein
each of the bead portions is provided on the outer surface with vent lines protruding therefrom and extending continuously in the tire circumferential direction, wherein
the vent lines include
a radially outer vent line formed at a radial position radially outside a radial position of the above-said edges of the non-turnup carcass ply, and
a radially inner vent line formed at a radial position radially inside the radial position of the above-said edges of the non-turnup carcass ply.

It is preferable that the radial positions of the non-turnup carcass ply's edges are within the radial extents of the respective bead cores.

It is preferable that the radially outer vent line is located radially outside a bead heel, and the radially inner vent line is located radially inside the bead heel.

Each of the sidewall portions comprise a sidewall rubber disposed on the axially outer side of the non-turnup carcass ply, and the radially inner vent line is preferably located at a radial position substantially same as a radial position of a radially inner edge of the sidewall rubber.

It is preferable that each bead portion is provided with a reinforcing filler disposed between the non-turnup carcass ply and the sidewall rubber, and having a radially inner edge located at a radial position between those of the radially outer vent line and the radially inner vent line.

It is preferable that each bead portion is provided with an insulation rubber extending radially inwardly from a position on the axially inner side of the main portion of the turned-up carcass ply, then extending radially outwardly along the turned up portion, and terminating so as to have an edge at a radial position between the radially inner vent line and the radially outer vent line.

It is preferable that each bead portion is provided with radial vent lines extending between the radially outer vent line and the radially inner vent line.

It is preferable that the radial vent lines extends radially inwardly from the radially outer vent line, beyond the radially inner vent line, and then terminate.

According to another aspect of the present invention, a mold for vulcanization-molding the pneumatic tire described above, comprises a bead ring for forming the bead portions is provided with vent grooves to form the vent lines.

Therefore, in the pneumatic tire according to the present invention, since the edge portions of the non-turnup carcass ply overlap the turnup portions (edge portions) of the turned-up carcass ply, the carcass can increase the rigidity of the bead portions and thereby improve the durability of the bead portions.

Since the bead portions are each provided with the circumferentially continuously extending vent lines which are respectively positioned radially inside and outside the non-turnup carcass ply's edges, even if air is trapped in a step formed by each edge of the non-turnup carcass ply during building a raw tire, the air can be discharged when the vent lines are formed during vulcanization molding the tire. Thus, the bead portions can be reduced in the occurrence of molding defects due to the air remained undischarged. Therefore, in the pneumatic tire according to the present invention, the molding defects can be lessened, and the durability of the bead portions can be improved.

DESCRIPTION OF THE PREFERRED EMBODIMENTS

The present invention is applied to pneumatic tires for light trucks, passenger cars and the like, in particular, suitably applied to a pneumatic tire for light trucks.

Therefore, taking a light truck tire as an example, embodiments of the present invention will now be described in detail in conjunction with the accompanying drawings.

Figure 1:
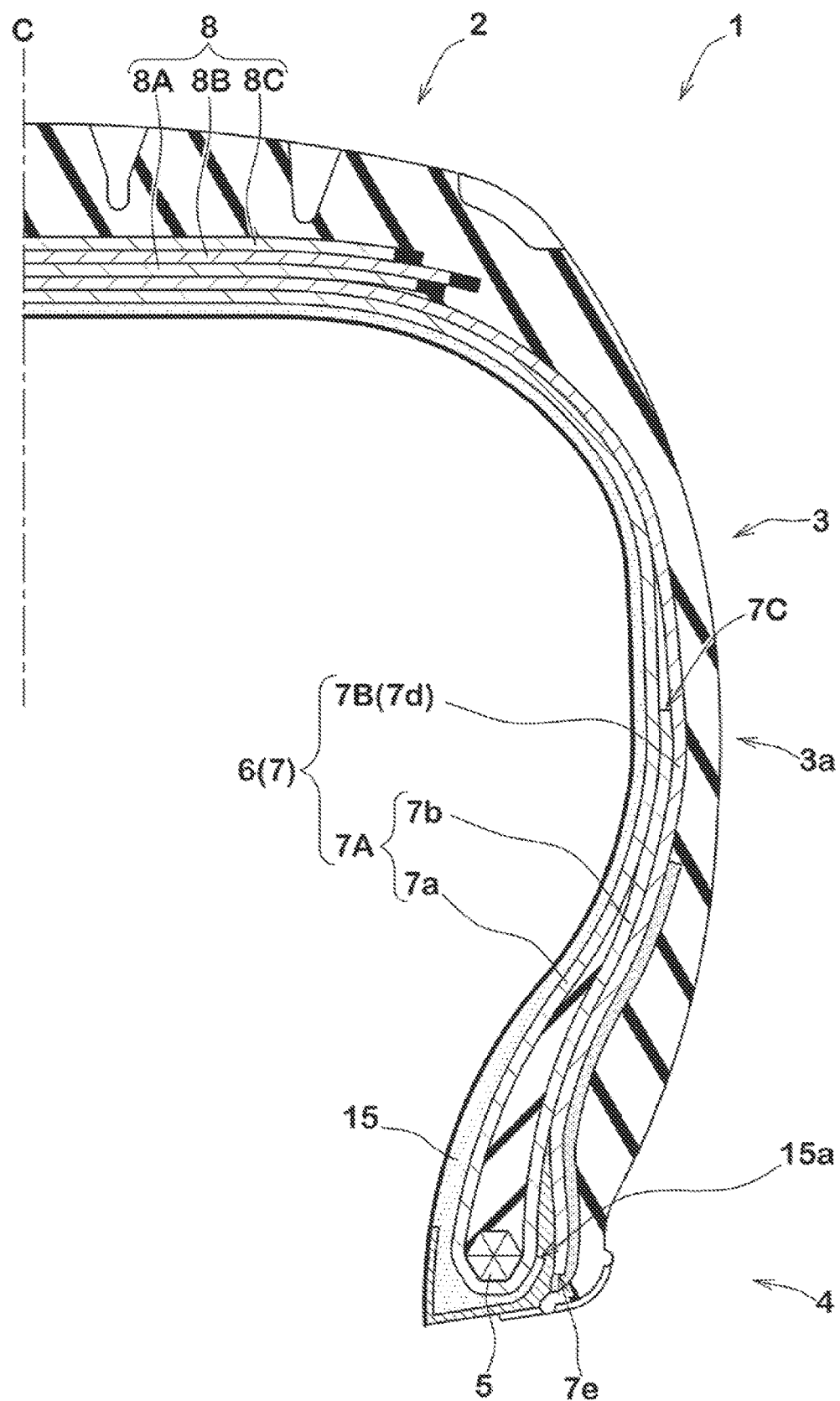
FIG. 1 is a cross-sectional partial view of a pneumatic tire as an embodiment of the present invention.

FIG. 1 is a meridian cross-sectional partial view of a pneumatic tire 1 as an embodiment of the present invention (hereinafter, simply referred to as the "tire" 1) under its normally inflated unloaded condition.

The normally inflated unloaded condition is such that the tire is mounted on a standard wheel rim and inflate to a standard pressure but loaded with no tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and a standard tire load are the maximum air pressure and the maximum tire load for the tire specified by the same organization in the Air-pressure/Maximum-load Table or similar list.

For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like.

In this application including specification and claims, various dimensions, positions and the like of the tire refer to those under the normally inflated unloaded condition of the tire unless otherwise noted.

The tire 1 in this embodiment comprises a tread portion 2, a pair of sidewall portions 3, a pair of bead portions 4 each with a bead core 5 embedded therein, a carcass 6 comprising carcass plies 7 extending between the bead portions 4 through the tread portion 2 and the sidewall portions 3, and a tread reinforcing belt 8 disposed radially outside the carcass 6 in the tread portion 2.

The carcass plies 7 include
a turned-up carcass ply 7A disposed on the inner side in the tire radial direction in the tread portion, and
a non-turnup carcass ply 7B disposed on the outer side in the tire radial direction of the turned-up carcass ply 7A in the tread portion.

The turned-up carcass ply 7A extends between the bead portions 4 through the tread portion 2 and the sidewall portions 3, and is turned up around the bead core 5 in each bead portion from the inside to outside of the tire to form a pair of turned up portions 7b and a main portion 7a therebetween.

The turnup portions 7b extend radially outwardly into the respective sidewall portions and terminate so that both edges 7c are located in the respective sidewall portions 3 in this example.

The non-turnup carcass ply 7B extends between the bead portions 4 through the tread portion 2 and the sidewall portions 3, and terminate in the respective bead portions 4 without being turned up, that is, the non-turnup carcass ply 7B is composed of a main portion 7d only.
In this example, both edges 7e of the non-turnup carcass ply 7B are positioned axially outside the respective turned up portions 7b.

Such carcass 6 can increase the rigidity of the bead portions 4, and thereby the durability of the bead portion 4 can be improved.

Figure 2:
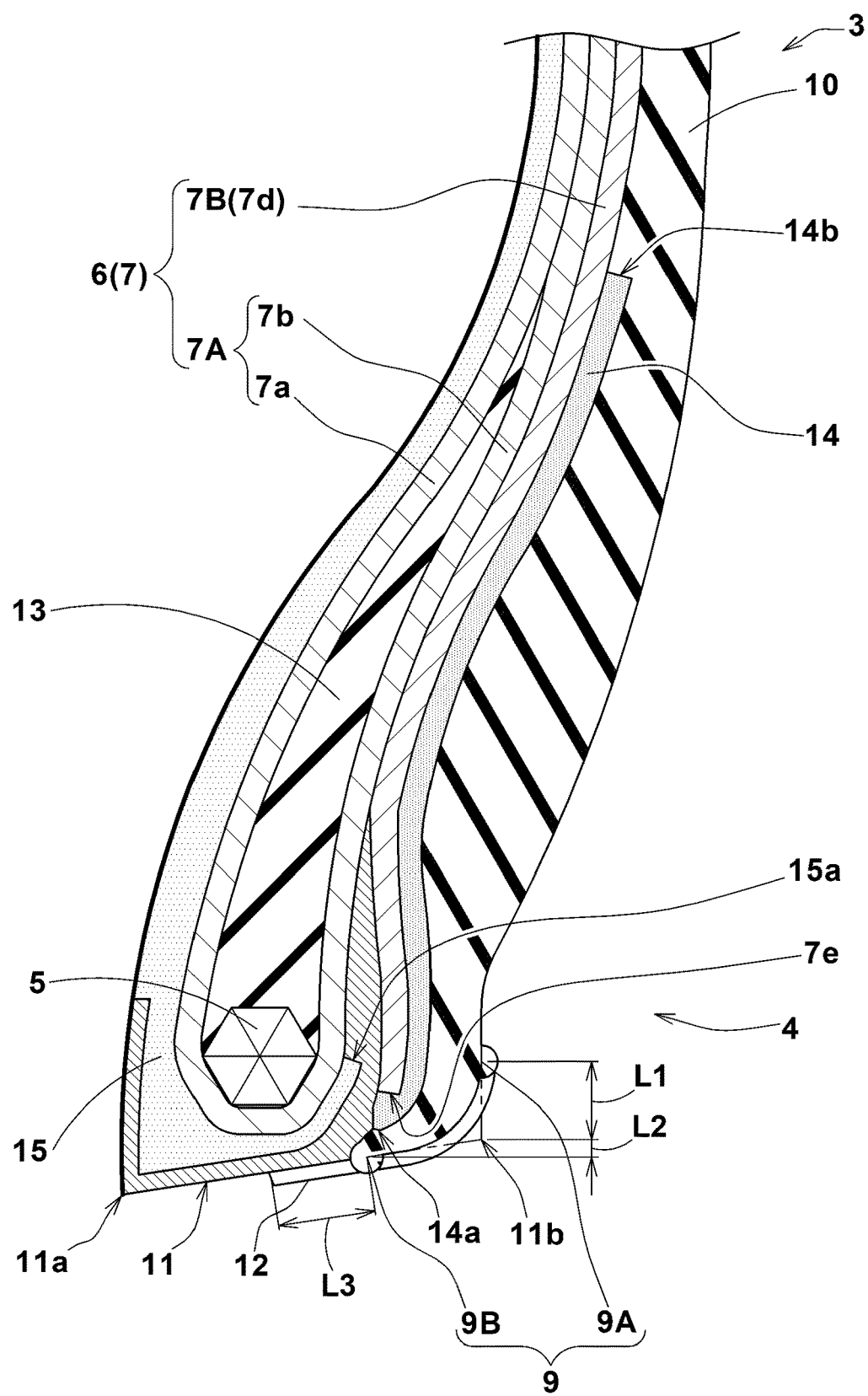
FIG. 2 is an enlarged cross-sectional view of the bead portion thereof.
Figure 3:
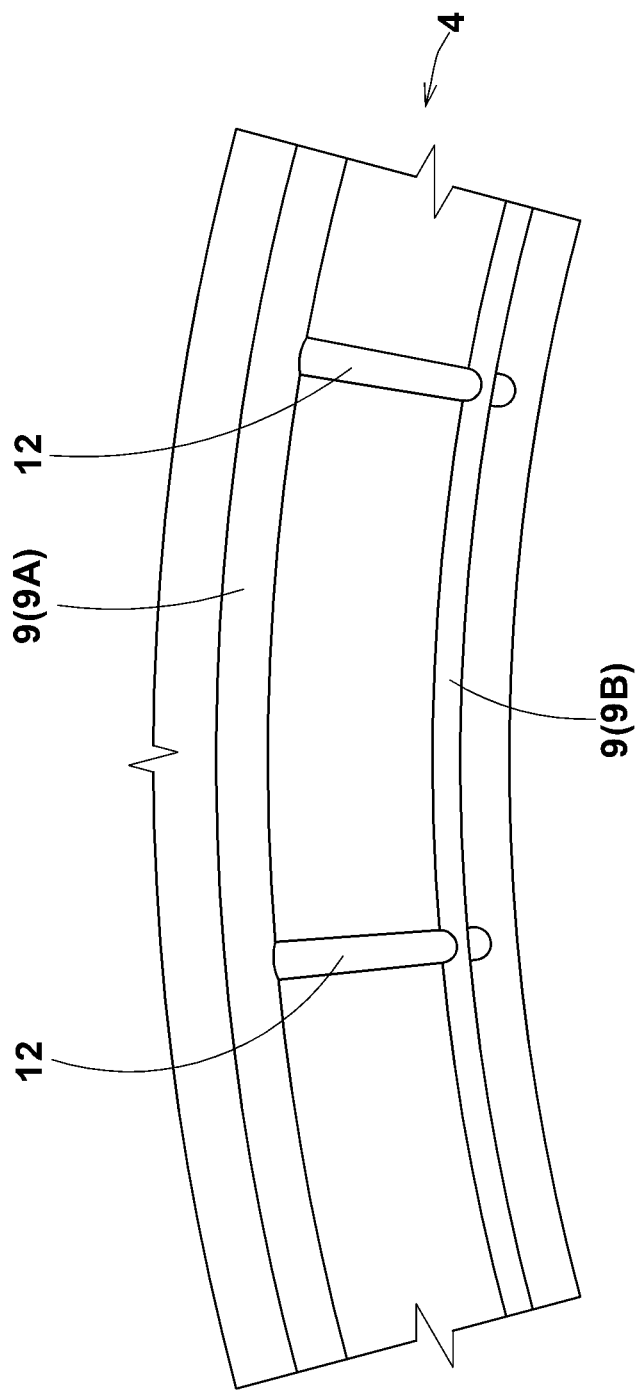
FIG. 3 is a partial side view of the bead portion.

As shown in FIGS. 2 and 3, the outer surface of the bead portion 4 is provided with vent lines 9 extending continuously in the tire circumferential direction.

Here, a vent line 9 is a small rib or ridge protruding from the outer surface of the bead portion 4, and formed by a vent groove 23a (shown in FIG. 4) formed in a shaping surface of a mold 20 for vulcanization molding the raw tire.

Such vent grooves are used to discharge air existing between the shaping surface of the mold 20 and the outer surface of the raw tire and/or inside the raw tire.

The vent lines 9 are formed by the rubber of the raw tire entered into the vent grooves after the air has been discharged.

As shown in FIG. 2, in each bead portion 4, the vent lines 9 include
a radially outer vent line 9A located radially outside the non-turnup carcass ply's edge 7e, and
a radially inner vent line 9B located radially inside the non-turnup carcass ply's edge 7e.

In general, air is liable to remain undischarged at the non-turnup carcass ply's edge 7e as a step is formed on the outer surface as shown in FIG. 2.

However, when the vent lines 9A and 9B are formed during vulcanization molding the tire, the air can be discharged through the vent grooves corresponding to the vent lines. Therefore, molding defect in the bead portion can be prevented, and the durability of the bead portion 4 can be improved.

In each of the sidewall portions 3, a sidewall rubber 10 is disposed on the axially outer side of the non-turnup carcass ply 7B.
The sidewall rubber 10 in this embodiment extends into the bead portion 4.
The sidewall rubber 10 in this embodiment extends radially inwardly beyond the bead core 5 in the tire radial direction.
On the axially outside of the non-turnup carcass ply 7B, the sidewall rubber 10 in this embodiment covers the edge 7e of the non-turnup carcass ply 7B. This facilitates the improvement in the durability of the bead portion 4.

In the present embodiment, the radially inner vent line 9B is located at the radially inner edge 10a of the sidewall rubber 10 in order to effective discharge air during vulcanization molding the tire, which air is liable to remain undischarged from a step formed at the radially inner edge 10a Thus, molding defect in the bead portion 4 can be prevented.

The bead portion 4 has a bead base 11 contacting with a bead seat of a wheel rim (not shown) when the tire is mounted on the wheel rim.
The bead portion 4 has a bead toe 11a and a bead heel 11b. The bead toe 11a is an axially innermost point of the bead base 11 in the meridian section of the tire. The bead heel 11b is an imaginary point at which a line which is extended axially outwardly along the bead base 11 intersects with a line which is extended radially inwardly along a substantially flat part of the axially outer surface of the bead portion contacting with a rim flange (not shown) of the wheel rim, in the meridian section of the tire under its in the normal state.

In the present embodiment, the radially outer vent line 9A is located radially outside the bead heel 11b.
The distance L1 in the tire radial direction between the radially outer vent line 9A and the bead heel 11b is preferably set in a range from 1.0 to 2.5 mm.
Such radially outer vent line 9A can effectively discharge air during vulcanization molding the tire, if air is trapped at the step formed by the non-turnup carcass ply's edge 7e, therefore, molding defect of the bead portion 4 can be prevented.

Preferably, the radially inner vent line 9B is located radially inside the bead heel lib.
The distance L2 in the tire radial direction between the radially inner vent line 9B and the bead heel lib is preferably 1.0 to 2.5 mm.
In the present embodiment, the radially inner vent line 9B is disposed in the bead base 11.
Such radially inner vent line 9B can effectively discharge air during vulcanization molding the tire, if air is trapped at a step formed by the radially inner edge 10a, therefore, molding defect of the bead portion 4 can be prevented.

In the present embodiment, as shown in FIGS. 2 and 3, each bead portion 4 is further provided with radial vent lines 12 connecting between the radially outer vent line 9A and the radially inner vent line 9B.
Each radial vent line 12 is a small rib or ridge protruding from the outer surface of the bead portion 4, and formed by a vent groove 23a (shown in FIG. 4) formed in the shaping surface of the mold 20 for vulcanization molding the raw tire.
Preferably, 12 to 24 radial vent lines 12 are arranged circumferentially of the tire in each bead portion 4.
Such radial vent lines 12 can lead air existing between the radially outer and inner vent lines 9A and 9B to the vent lines 9A and 9B at the time of vulcanization molding the tire, and the molding defect of the bead portion 4 can be more effectively prevented.

Preferably, the radial vent lines 12 extend radially inwardly from the radially outer vent line 9A beyond the radially inner vent line 9B, and immediately terminate at a distance L3 from the radially inner vent line 9B. The distance L3 is preferably 1 to 3 mm. In other words, the length L3 in the tire axial direction of the inner portion of the radial vent line 12 extending from the radially inner vent line 9B to the axially inner end of the vent line 12 is preferably 1 to 3 mm. Even if the radially inner edge 10a is displaced from the radially inner vent line 9B due to manufacturing variations, and air is trapped in a step formed at the radially inner edge 10a, such extended inner portions of the radial vent lines 12 can discharge the air during vulcanization molding the tire. Thus, the molding defect of the bead portion 4 can be more effectively prevented.

In the present embodiment, as shown in FIG. 1, the edges 7c of the turned up portions 7b of the turned-up carcass ply 7A are located in the vicinity of the maximum tire width portion 3a where the cross sectional width of the tire is maximum. The edges 7e of the non-turnup carcass ply 7B are located axially outside the bead cores 5 in the respective bead portions 4. More specifically, each edge 7e in this example is positioned within the radial extent of the bead core 5. Such carcass plies 7 can increase the rigidity of the bead portion 4, and the durability of the bead portions 4 can be improved.

In the present embodiment, the tread reinforcing belt 8 has a three-layer structure comprising a first belt ply 8A disposed onto the radially outside of the carcass 6, a second belt ply 8B disposed onto the radially outside of the first belt ply 8A, and a third belt ply 8c disposed onto the radially outside of the second belt ply 8B.
The tread reinforcing belt 8 increases the rigidity of the tire 1 so as to withstand heavy loads, and suppress movement of the carcass plies 7, therefore, the tread reinforcing belt 8 can improve the durability of the bead portions 4.

As shown in FIG. 2, each bead portion 4 is provided, between the turnup portion 7b and the main portion 7a of the turned-up carcass ply 7A, with a rubber bead apex 13 extending radially outwardly from the bead core 5 in a tapered manner to have a triangular cross section.
The bead apex 13 can maintain an appropriate rigidity of the bead portion 4 and can improve the durability of the bead portion 4.

In this embodiment, between the sidewall rubber 10 and the non-turnup carcass ply 7B in each bead portion 4, there is disposed a reinforcing filler 14 extending radially outwardly from its radially inner edge 14a which is located between the radially outer vent line 9A and the radially inner vent line 9B. Thus, air trapped in a step formed by the radially inner edge 14a can be discharged when the vent lines 9A and 9B are formed during vulcanization molding the tire, and thereby molding defect can be reduced.
Preferably. the reinforcing filler 14 in this example is extended into the sidewall portion, for example, the radially outer edge 14b thereof is positioned at a radial height comparable to the radial height of the bead apex 13. Such reinforcing filler 14 can improve the rigidity and the durability of the bead portion 4.

In the present embodiment, as shown in FIGS. 1 and 2, the bead portion 4 is provided with an insulation rubber 15. The insulation rubber 15 is disposed along the turned-up carcass ply 7A so as to extend from the main portion 7a to the turnup portion 7b of the turned-up carcass ply 7A.
Preferably, the insulation rubber 15 extends between the bead portions 4 through the tread portion 2 and the sidewall portion 3. The insulation rubber 15 improves the air permeation resistance of the tire 1, and can prevent the leakage of air from the inside to the outside of the tire 1. This prevents the bead portion 4 from being overload when the air pressure of the tire becomes insufficient, and can improve the durability of the bead portion 4.

The insulation rubber 15 in this example terminates at a position on the axially outside of the turnup portions 7b, and the terminal end 15a of the insulation rubber 15 is preferably located between the radially outer vent line 9A and the radially inner vent line 9B.
Such bead portion 4 can discharge air trapped in a step formed by the terminal end 15a, when the vent lines 9A and 9B are formed during vulcanization molding the tire, thereby molding defect can be reduced.

Figure 4:
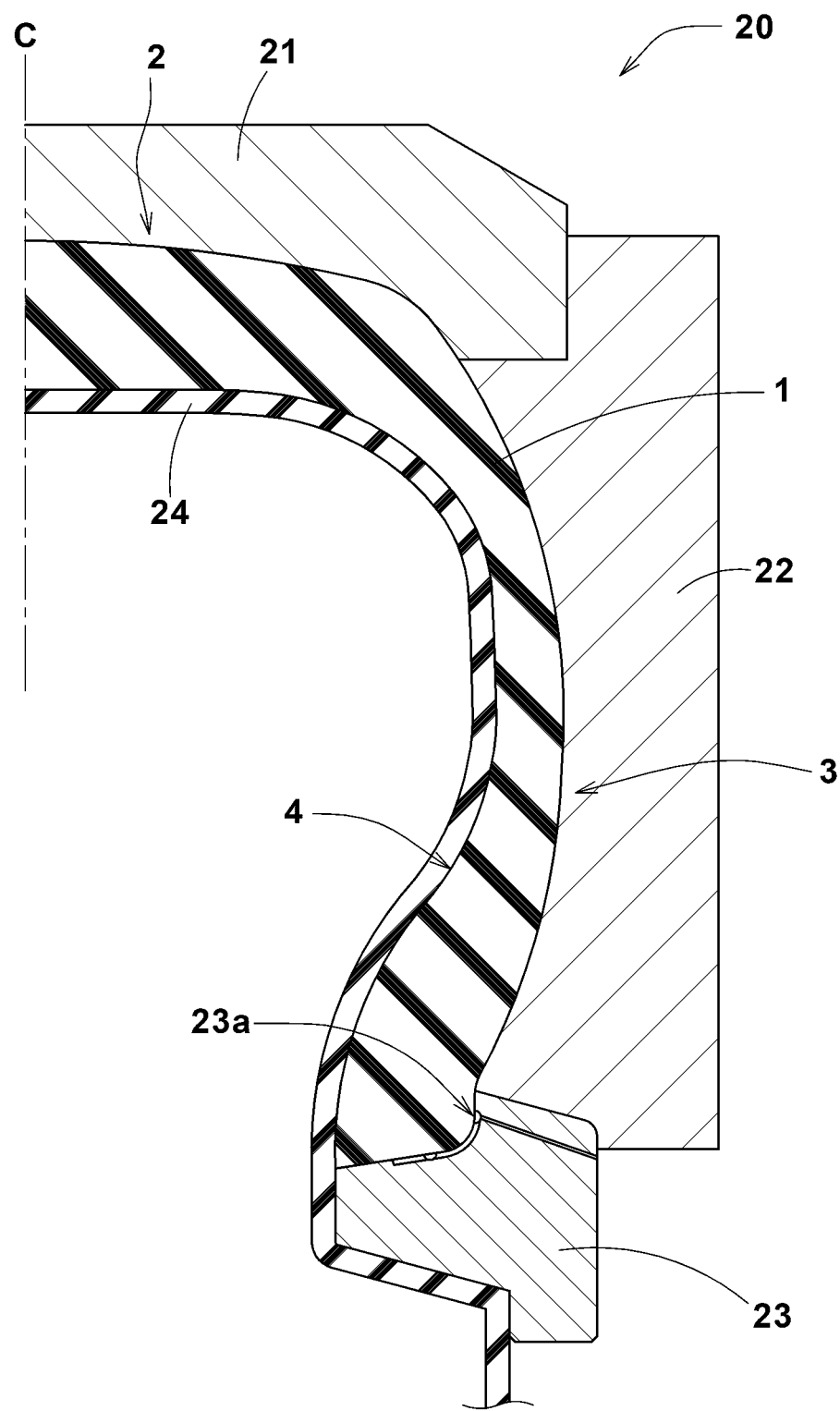
FIG. 4 is a cross-sectional partial view of a vulcanization mold for vulcanization molding the pneumatic tire.

FIG. 4 shows a cross section of a mold 20 for vulcanization molding the tire 1.
In this embodiment, the mold 20 comprises a tread ring 21 for molding the tread portion 2, side rings 22 for molding the respective sidewall portions 3, and bead rings 23 for molding the respective bead portions 4.
The mold 20 is used together with an expandable bladder 24. The bladder 24 is disposed inside the raw tire 1 get in the mold 20 and expanded to press the tire against the mold 20.

Each bead ring 23 is provided with air vent grooves 23a for forming the above-mentioned circumferential vent lines 9 (9A and 9B) and the radial vent lines 12.
The vent grooves 23a are for discharging air existing between the raw tire 1 and the mold 20 and/or inside the raw tire during vulcanization molding the tire in order to prevent the molding defect of the bead portions of the vulcanized tire 1.

While detailed description has been made of preferable embodiments of the present invention, the present invention can be embodied in various forms without being limited to the illustrated embodiments.

Comparison Tests

Based on the structure shown in FIG. 1, pneumatic tires of size 205/80R15 109/107N having specifications shown in Table 1 were experimentally manufactured by using vulcanization molds whose structures were the same as that shown in FIG. 4 except for vent grooves.
Then, the rate of occurrence of molding defects of each test tire was checked, and each vulcanized test tire was measured for the bead retaining force of the bead portions as follows.

<Occurrence Rate of Molding Defect>
1920 pieces of each test tire were manufactured, and the occurrence of molding defects such as bareness of rubber wag observed, and the number of the tires having molding defects was counted to obtain the occurrence rate.
The obtained occurrence rates are shown in Table 1 in percentage, wherein the smaller the numerical value, the lesser the molding defects.

<Bead Retaining Force>
Using a bead compression machine for measuring the expansion force of a tire bead, each vulcanized test tire was measured for the bead seat contact pressure to evaluate the bead retaining force.
The results are indicated in Table 1 by an index based on comparative example 1 being 100, wherein the larger the numerical value, the higher the bead durability.

TABLE 1

| Tire | Comparative Example 1 | Comparative Example 2 | Embodiment 1 | Embodiment 2 | Embodiment 3 |
|---|---|---|---|---|---|
| Present or Absent of Radially outer vent line | absent | present | present | present | present |
| Whether Position of Non-turnup carcass ply's edges is inside or outside Range between Radially outer vent line and Radially inner vent line | — | outside | inside | inside | inside |
| Present or Absent of Radial vent lines | absent | present | present | absent | present |
| Distance L1 (mm) between Radially outer vent line and Bead heel | — | 1.5 | 1.5 | 1.5 | 0.5 |
| Distance L2 (mm) between Radially inner vent line and Bead heel | 1.0 | 1.0 | 1.0 | 1.0 | 1.0 |
| Occurrence rate of molding defect (%) | 2.5 | 3.8 | 0.0 | 1.2 | 1.5 |
| Bead retaining force | 100 | 100 | 100 | 100 | 100 |

| Tire | Embodiment 4 | Embodiment 5 | Embodiment 6 | Embodiment 7 | Embodiment 8 |
|---|---|---|---|---|---|
| Present or Absent of Radially outer vent line | present | present | present | present | present |
| Whether Position of Non-turnup carcass ply's edges is inside or outside Range between Radially outer vent line and Radially inner vent line | inside | inside | inside | inside | inside |
| Present or Absent of Radial vent lines | present | present | present | present | present |
| Distance L1 (mm) between Radially outer vent line and Bead heel | 1.0 | 2.5 | 3.0 | 1.5 | 1.5 |
| Distance L2 (mm) between Radially inner vent line and Bead heel | 1.0 | 1.0 | 1.0 | 0.5 | 2.0 |
| Occurrence rate of molding defect (%) | 0.5 | 0.4 | 1.7 | 0.5 | 0.3 |
| Bead retaining force | 100 | 100 | 100 | 105 | 95 |

From the test results, it was confirmed that the pneumatic tires according to the present invention were reduced in the occurrence of molding defects, while maintaining the bead retaining forces comparable to the comparative examples. Thus, the tires according to the present invention can achieve THE reduction of molding defects and the durability of the bead portions.

DESCRIPTION OF THE REFERENCE SIGNS 1 pneumatic tire
2 tread portion
4 bead portion
5 bead core
7 carcass ply
7A turned-up carcass ply
7B non-turnup carcass ply
7a main portion
7b turnup portion
7e non-turnup carcass ply's edges
9 vent line
9A radially outer vent line
9B radially inner vent line

The invention claimed is:
1. A pneumatic tire comprising:
a tread portion,
a pair of sidewall portions,
a pair of bead portions each with a bead core embedded therein, and
a carcass composed of carcass plies extending between the bead portions through the tread portion and the sidewall portions,
wherein
the carcass plies include a turned-up carcass ply and a non-turnup carcass ply,
the turned-up carcass ply extends between the bead portions and is turned up around the bead core in each bead portion from the axially inside to the outside of the tire so as to form a pair of turned up portions extending radially outwardly on the axially outsides of the respective bead cores, and a main portion extending between the turned up portions, and
the non-turnup carcass ply extends between the bead portions and terminates so that edges thereof are positioned on the axially outsides of the respective turned up portions,
wherein
each of the bead portions is provided on the outer surface with circumferential vent lines protruding therefrom and extending continuously in the tire circumferential direction,
wherein
the circumferential vent lines include a radially outer circumferential vent line formed at a radial position radially outside a radial position of the above-said edges of the non-turnup carcass ply, and a radially inner circumferential vent line formed at a radial position radially inside the radial position of the above-said edges of the non-turnup carcass ply,.

wherein each of the bead portions is provided on the outer surface with radial vent lines protruding therefrom and extending radially inwardly from the radially outer circumferential vent line, beyond the radially inner circumferential vent line, and terminate.

2. The pneumatic tire according to claim 1, wherein the radial positions of the non-turnup carcass ply's edges are within the radial extents of the respective bead cores.

3. The pneumatic tire according to claim 2, wherein each of the sidewall portions comprise a sidewall rubber disposed on the axially outer side of the non-turnup carcass ply, and the radially inner circumferential vent line is located at a radial position substantially same as a radial position of a radially inner edge of the sidewall rubber.

4. The pneumatic tire according to claim 3, wherein each of the bead portions is provided with a reinforcing filler disposed between the non-turnup carcass ply and the sidewall rubber, and having a radially inner edge located at a radial position between those of the radially outer circumferential vent line and the radially inner circumferential vent line.

5. The pneumatic tire according to claim 1, wherein the radially outer circumferential vent line is located radially outside a bead heel, and the radially inner circumferential vent line is located radially inside the bead heel.

6. The pneumatic tire according to claim 5, wherein each of the sidewall portions comprise a sidewall rubber disposed on the axially outer side of the non-turnup carcass ply, and the radially inner circumferential vent line is located at a radial position substantially same as a radial position of a radially inner edge of the sidewall rubber.

7. The pneumatic tire according to claim 6, wherein each of the bead portions is provided with a reinforcing filler disposed between the non-turnup carcass ply and the sidewall rubber, and having a radially inner edge located at a radial position between those of the radially outer circumferential vent line and the radially inner circumferential vent line.

8. The pneumatic tire according to claim 1, wherein each of the sidewall portions comprise a sidewall rubber disposed on the axially outer side of the non-turnup carcass ply, and the radially inner circumferential vent line is located at a radial position substantially same as a radial position of a radially inner edge of the sidewall rubber.

9. The pneumatic tire according to claim 8, wherein each of the bead portions is provided with a reinforcing filler disposed between the non-turnup carcass ply and the sidewall rubber, and having a radially inner edge located at a radial position between those of the radially outer circumferential vent line and the radially inner circumferential vent line.

10. The pneumatic tire according to claim 1, wherein each of the bead portions is provided with an insulation rubber extending radially inwardly from a position on the axially inner side of the main portion of the turned-up carcass ply, then extending radially outwardly along the turned up portion, and terminating so as to have an edge at a radial position between the radially inner circumferential vent line and the radially outer circumferential vent line.

11. A mold for vulcanization-molding a pneumatic tire comprising:

a tread portion, a pair of sidewall portions, a pair of bead portions each with a bead core embedded therein, and a carcass composed of carcass plies extending between the bead portions through the tread portion and the sidewall portions, wherein the carcass plies include a turned-up carcass ply and a non-turnup carcass ply, the turned-up carcass ply extends between the bead portions and is turned up around the bead core in each bead portion from the axially inside to the outside of the tire so as to form a pair of turned up portions extending radially outwardly on the axially outsides of the respective bead cores, and a main portion extending between the turned up portions, and the non-turnup carcass ply extends between the bead portions and terminates so that edges thereof are positioned on the axially outsides of the respective turned up portions, wherein each of the bead portions is provided on the outer surface with circumferential vent lines protruding therefrom and extending continuously in the tire circumferential direction, wherein the circumferential vent lines include a radially outer circumferential vent line formed at a radial position radially outside a radial position of the above-said edges of the non-turnup carcass ply, and a radially inner circumferential vent line formed at a radial position radially inside the radial position of the above-said edges of the non-turnup carcass ply, wherein each of the bead portions is provided on the outer surface with radial vent lines protruding therefrom and extending radially inwardly from the radially outer circumferential vent line, beyond the radially inner circumferential vent line, and terminate, the mold comprising bead rings for forming the bead portions which are provided with vent grooves for forming the circumferential vent lines and the radial vent lines.

* * * * *